United States Patent
Bouwkamp et al.

(10) Patent No.: US 12,115,403 B2
(45) Date of Patent: *Oct. 15, 2024

(54) PUMP OPERATION PANEL SIMULATOR

(71) Applicant: FAAC Incorporated, Ann Arbor, MI (US)

(72) Inventors: David S. Bouwkamp, Dexter, MI (US); William Martin, Perrysburg, OH (US); Nikolaos Dimitri Zachary Kazakos, Ypsilanti, MI (US); James R. Mason, Manchester, MI (US); Dale Eammon Atkin, Dundee, MI (US); Travis Staley, Milan, MI (US); Steven Olson, Ann Arbor, MI (US); Joseph Lewis Clift, Signal Mountain, TN (US); Stuart Ball, Uniontown, OH (US); Philip C. Duczyminski, Ypsilanti, MI (US)

(73) Assignee: FAAC Incorporated, Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/516,284

(22) Filed: Nov. 21, 2023

(65) Prior Publication Data

US 2024/0082617 A1    Mar. 14, 2024

Related U.S. Application Data

(63) Continuation of application No. 18/169,018, filed on Feb. 14, 2023, now Pat. No. 11,857,818, which is a
(Continued)

(51) Int. Cl.
| | |
|---|---|
| *A62C 99/00* | (2010.01) |
| *G06T 19/00* | (2011.01) |
| *G09B 9/00* | (2006.01) |

(52) U.S. Cl.
CPC ........ *A62C 99/0081* (2013.01); *A62C 99/009* (2013.01); *G06T 19/006* (2013.01); *G09B 9/00* (2013.01)

(58) Field of Classification Search
CPC . A62C 99/0081; A62C 99/009; G06T 19/006; G09B 9/00
See application file for complete search history.

(56) References Cited

U.S. PATENT DOCUMENTS

| | | | | |
|---|---|---|---|---|
| 4,545,766 | A * | 10/1985 | Schoessow | G09B 9/00 434/218 |
| 5,413,488 | A * | 5/1995 | Gibson | G09B 19/00 434/432 |

(Continued)

OTHER PUBLICATIONS

FIF LLC, Inc., "Online Virtual Pump Panel™—Fire Apparatus Trainer", Dec. 13, 2017, Facebook.com, pp. 1-3, at https://www.facebook.com/fullyinvolvedfire/videos/online-virtual-pump-panel-fire-apparatus-trainer/1586978821383645 (last visited Apr. 3, 2024). (Year: 2017).*

(Continued)

*Primary Examiner* — Steve Rowland
(74) *Attorney, Agent, or Firm* — Howard & Howard Attorneys PLLC

(57) ABSTRACT

A pump panel training device is provided and includes a plurality of simulated gages operable to imitate gages upon a fire truck pump panel, a plurality of simulated controls operable to imitate controls upon the fire truck pump panel, and a simulated water hose operable to imitate one of water temperature changes, water temperature pressure, and water hose vibration for the fire truck pump panel.

20 Claims, 12 Drawing Sheets

Related U.S. Application Data continuation of application No. 16/570,717, filed on Sep. 13, 2019, now Pat. No. 11,583,716.

(60) Provisional application No. 62/732,304, filed on Sep. 17, 2018.

(56) References Cited

U.S. PATENT DOCUMENTS

| | | | | |
|---|---|---|---|---|
| 9,399,151 | B1* | 7/2016 | Combs | G05B 19/409 |
| 2003/0083789 | A1* | 5/2003 | Kalley | G09B 5/06 |
| | | | | 701/1 |
| 2005/0233289 | A1* | 10/2005 | Hoglund | G09B 19/00 |
| | | | | 434/226 |
| 2006/0240392 | A1* | 10/2006 | Clifton | A62C 99/0081 |
| | | | | 434/226 |
| 2009/0197229 | A1* | 8/2009 | Blackburn | G09B 19/00 |
| | | | | 434/226 |
| 2012/0061108 | A1* | 3/2012 | Cerrano | A62C 37/00 |
| | | | | 169/46 |
| 2019/0118016 | A1* | 4/2019 | Severijns | G09B 19/00 |
| 2021/0370117 | A1* | 12/2021 | Park | G09B 9/00 |

OTHER PUBLICATIONS

Node, "Scariest VR Game We've Ever Played!—Iron Wolf", Feb. 16, 2018, Youtube.com, pp. 1-2, at https://www.youtube.com/watch?v=aZick_w7714 (last visited Apr. 3, 2024). (Year: 2018).*

* cited by examiner

PUMP OPERATION PANEL SIMULATOR

CROSS REFERENCE TO RELATED APPLICATIONS

This disclosure is a continuation of U.S. patent application Ser. No. 18/169,018 filed on Feb. 14, 2023 which is a continuation of U.S. patent application Ser. No. 16/570,717 filed on Sep. 13, 2019 which claims the benefit of U.S. Provisional Application No. 62/732,304 filed on Sep. 17, 2018, all of which are hereby incorporated by reference.

TECHNICAL FIELD

This disclosure is a training simulator, and, in particular, to a training simulator used to simulate operation of features of an emergency responder vehicle.

BACKGROUND

The statements in this section merely provide background information related to the present disclosure. Accordingly, such statements are not intended to constitute an admission of prior art.

Fire department vehicles and other similar vehicles include complex systems that are installed or loaded onto the vehicle. In one exemplary embodiment, a fire pump truck includes incoming and outgoing water lines, for example, receiving a water flow from a fire hydrant, providing pressure to the water flow, and providing the pressurized water flow to fire fighters. Such pump trucks are complicated devices. Operating the pump machinery on the pump truck incorrectly can have adverse results. Too little pressure can result in fire fighters not being able to adequately fight fires and can result in increased injuries and property damage. Too much pressure can damage the pump machinery, damage hoses, and hamper firefighting efforts with unpredictable equipment behavior. A pump overheating can similar cause damage and cause unpredictable equipment behavior.

SUMMARY

A pump panel training device is provided and includes a plurality of simulated gages operable to imitate gages upon a fire truck pump panel, a plurality of simulated controls operable to imitate controls upon the fire truck pump panel, and a simulated water hose operable to imitate one of water temperature changes, water temperature pressure, and water hose vibration for the fire truck pump panel.

BRIEF DESCRIPTION OF THE DRAWINGS

One or more embodiments will now be described, by way of example, with reference to the accompanying drawings, in which.

DETAILED DESCRIPTION

Figure 1:
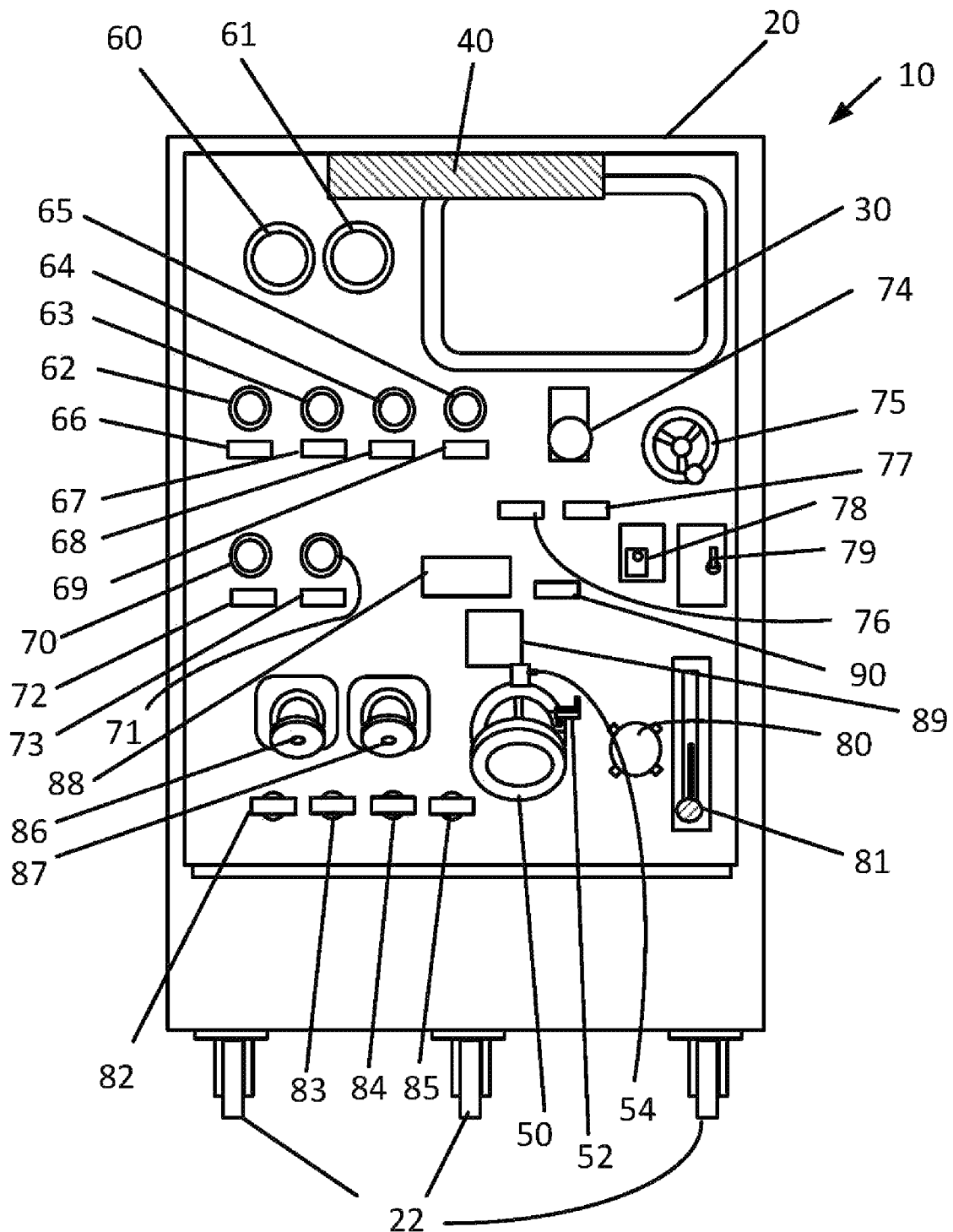
FIG. 1 schematically illustrates in a front view an exemplary first embodiment of a pump panel training device, in accordance with the present disclosure.

Pump trucks and the associated pump equipment are complicated machinery. Skilled technicians working on the equipment use information from many different sources to confirm that the pump is working correctly, from visual information from gages and video displays, sound from the pump machinery, and tactile inputs such as vibrations in the pump housings and water pressures, temperatures, and oscillations in the fire hoses. A video screen only simulation would miss out on the complexities of the multiple senses needed to adequately monitor the pump equipment. Additionally, sound generated by electronic speakers is different from sounds generated from actual functioning equipment, missing directional queues and accompanying vibrations that give the operator a more complete sense of how the equipment is functioning.

A pump operation panel simulator and simulation method is provided including a range of sensory signals. Embodiments of disclosed methods include heating and/or cooling of primary pump inlet for pump operation panel training devices.

During the operation of a water pump, lack of knowledge, training and experience on the part of the pump operator can lead to the pump overheating which can result in equipment damage that is expensive to repair. To get a sense of the pump temperature the pump operator touches the pump's primary intake components. Exposing the pump operator to a training simulator device that provides tactile feeling of heat and cold at the pump intake provides the student operator a more realistic training experience.

Thermoelectric device is used to provide heating and cooling of the pump intake components. During a training exercise, the simulated pump computes the pump temperature as a function of water flow rate through the pump and pump rotational velocity. Pump temperature is transmitted to the thermoelectric cooling system via the training devices input/output system.

After the completion of a training exercise, the training device's pump inlet hardware must be driven to temperature necessary to start the next training exercise.

Inflating/deflating soft inlet hose line can also be an object of the training simulation. During the operation of a fire truck pump, the operator can be directed to sense water source pressure by the tactile feel of the water source feed hose inflation against his or her leg. A pump operator training device that provides this tactile feel gives the student pump operator a more immersive training experience.

A short length of inlet soft hose fitted internally with a bladder and electrically actuated valves connected to a compressed air supply such that the inflation can be remotely controlled. The simulation of the hydrant pressure and water flow rate in the water source line is used compute the pressure necessary to inflate the bladder within the short length of inlet hose. A compressed air source is used to inflate the bladder.

Additional features can include a tandem/relay operation and dual pumping simulation. In real life fire-fighting, often a water source is not ideally located relative to the fire. Either the water source is too far away or height differential provides too much pressure loss to effectively fight the fire. To overcome these problems, multiple pumping trucks or pumping devices can be used in sequence and/or in parallel to feed water from the water source to a location where it is needed.

An embodiment of the disclosed simulator can include a plurality of pump panel training devices to simulate the connection of multiple pumping devices to deliver water from a water source to a destination where it is needed. Training for this kind of situation can be accomplished by using pump panel training devices that can support tandem/relay and dual pumping operations. In one embodiment, a simulation system can couple two or more pump panel training devices via network connection. Such a network of connected panel training device can provide a team training environment where one pump operator on one apparatus must compensate for the actions of another pump operator on another apparatus.

In one exemplary operation where two pump panel training devices are utilized to simulate two pumping devices connected in sequence, a first pump panel training device can be utilized to simulate a first pumping device drawing water from a water source and supplying an intermediate flow of water to a second pumping device, and a second pump panel training device can be utilized to simulate the second pumping device, drawing water from the intermediate flow of water and delivering the water to a location that needs the water. Parameters regarding the water source can be provided to the first pump panel training device, and inputs to the first pump panel training device by a first trainee can be used to determine simulated operating parameters for the first pump panel training device including properties of the intermediate flow of water, including flow rate, temperature, water pressure, etc. These properties of the intermediate flow of water are provided by communication network to the second pump panel training device. These properties of the intermediate flow of water in combination with inputs to the second pump panel training device by a second trainee can be used to determine simulated operating parameters for the second pump panel training device including properties of an outlet flow of water to be supplied to the destination that needs the water. Simulation of a sequence of two pumping devices is provided as an example of how the disclosed simulator may be operated, multiple variations of this example are envisioned, and the disclosure is not intended to be limited to the particular examples provided.

Input parameters to a simulation event can be preset as parameters to one of a sequence of training programs. In one exemplary embodiment, a series of pre-programmed simulation events of increasing difficulty can be provided with a pump panel training device. In another exemplary embodiment, a randomized simulation event can be operated, for example, with a trainee or an instructor being given an ability to establish a range of values or a likelihood of events occurring as part of the randomized simulation event. In another exemplary embodiment, an instructor operating a remote computerized device such as a laptop computer or a smart-phone can be given a supervisory application, enabling the instructor to monitor performance of the trainee and control inputs to the program, for example, prompting simulated occurrences such as an acute hose failure or interruption of a water source during a simulation event. Such a remote computerized device can be described as an instructor operator station. According to one embodiment, the primary responsibilities of the instructor can include selecting a pre-programmed simulation event, setting a hose configuration for a simulation event, monitoring progress of a simulation event, generating simulated malfunctions in simulated equipment during a simulation event, selecting programmed options for a simulation event, and preparing reports to summarize performance during a simulation event. Reports to summarize a trainee's performance can rate an effectiveness of delivering water to the location needing water (for example, summarizing an estimate of gallons delivered), describe equipment failures caused by the trainee, and failure by the trainee to follow particular instructions such as turning a discharge handle too quickly. According to one embodiment, a simulation event status display can be provided to the instructor, providing the instructor with copies of the gages visible to the trainee, representations of all control inputs manipulated by the trainee, a summary of all actions taken so far by the trainee, a summary of upcoming programmed events in the simulation event yet to occur, and options for making any equipment within the pump panel training device fail upon command of the instructor. For example, the instructor can be provided with a touch screen display, and the instructor can make any one of the gages visible to the trainee fail by touching the area of the touch screen display showing the gage.

Input parameters to a simulation event can include a wide variety of factors, including but not limited to information about water sources, water tank level, foam tank level, pump engine operation status, pump engine temperature, hose diameters, hose lengths, water usage of an outlet flow (for example, on/off status for one or more spray nozzles), ambient temperature and other ambient weather effects, water temperature, equipment failure status (for example, timed occurrence of hose blockage), and programmed events such as a radio message being played at a particular time.

Simulation event outputs can include gage readings; graphical images displayed upon an inset video monitor; graphical images displayed upon an external video monitor; sound outputs provided through an audio system; sound outputs provided through a simulated emergency radio system; vibratory outputs simulated, for example, through operation of a motor including an offset weight upon an motor output shaft; simulated water inlet parameters such as temperature, vibration, and hose inflation; simulated water outlet parameters such as temperature, vibration, and hose inflation; and warning and status lights.

A variety of control inputs can incorporated in or attached to a pump panel training device. For example, a pump panel training device can include a lever, knob, or other control input for opening and closing a primary water inlet; a lever, knob, other control input for opening and closing a secondary water inlet; a lever, knob, other control input for opening and closing a pump inlet; a lever, knob, other control input for opening and closing each of a plurality of water outlets or discharge lines; a lever, knob, other control input for opening and closing each of a plurality of pre-connect lines; a lever, knob, other control input for opening and closing an on-board tank fill and recirculating line; a lever, knob, other control input for opening and closing an on-board tank to pump line; a lever, knob, other control input for opening and closing drain valves; a lever, knob, other control input for controlling priming the pump (removing air from a water pump inlet); a knob or other control input for controlling a pump engine throttle; controls operable to control flow of a fire-fighting foam to a pump; controls associated with a two stage pump; a horn control switch; and a knob or other control input for controlling a relief valve useful to control pump pressure. Other control inputs related to various other actual pump panel functions can additionally or alternatively be utilized. A control useful to simulate control of engine throttle can in one example include a n "OK-to-pump" indicator.

Visual outputs of a pump panel training device can a number of exemplary outputs, including but not limited to: gages indicating simulated water pressure in a number of attached lines; gages indicating engine water temperature, engine oil pressure, and engine rotational speed; gages and associated controls simulating an engine governor device; gages indicating status of an on-board water tank and an on-board foam tank;

Audio outputs provided by a pump panel training device can include but are not limited to engine sounds that respond to throttle and pump load, primer sounds, cavitation sounds, tank fill overflow sounds, open drain valve sounds, pressure relief valve operation sounds, and warning sounds. Additionally or alternatively, the audio system can include an intercom permitting an instructor to interact with a trainee.

An inset video monitor can be attached to a face of a pump panel training device and can be used to simulate a variety of control panels that can be present upon an actual pump panel. Such an inset video monitor can include a touch screen display, enabling a trainee to interact with the controls that can be present upon an actual pump panel.

An external video monitor can be attached proximate to a pump panel training device, for example, with a rotating and/or extending arm enabling movement of the external video monitor relative to the pump panel training device. In this way, a trainee can be presented with an external video monitor in a separate viewing direction away from the pump panel training device, such that the trainee can be required to split attention between the external video monitor and the pump panel training device to simulate complicated scenarios that can occur relative to an actual pump panel. For example, an external video monitor can display a representation of a fire hydrant hookup, a dump-tank hookup, a scene including simulated fire-fighters, a scene including hoses leading up to and leading away from the pump panel training device, a scene including a distant second fire truck including a pump panel, or other similar environmental scenes that can require the attention of a pump panel operator. In one embodiment, the external video monitor can display a hose and nozzle layout schematic, providing the trainee with necessary information to understand the network of hoses attached to the pump panel training device.

Simulated hoses and hose systems can include a variety of embodiments. In one exemplary embodiment, a hose section of one to a few feet in length can include a threaded connection fitting on a first end (operable to be attached to an inlet or outlet fitting upon a pump panel training device) and a crimped or sealed end upon a second end. Such a sealed hose section attached to the pump panel training device can be filled with air or water, and that air or water can be heated, cooled, vibrated, and/or pressurized to simulate various conditions in the hose. In another exemplary embodiment, a length of hose with threaded fitting on both ends, can be attached to the pump panel training device, and water or air can be cycled through the hose to simulate various conditions in the hose. In one embodiment, an auxiliary pump device can be used to cycle water or air through the hose and condition the water or air (control temperature, create vibrations, control pressure, etc.)

A simulation event can be programmed in order to simulate attachment of hoses to a fire department connection (PDC) system, which can include a connection on an outside of a building which enables connected hoses to supply water to a building's interior standpipe or sprinkler system. Maintaining water pressure within a selected range can be required for proper operation of an FDC system. Parameters of a simulation event can instruct a trainee regarding how to maintain a discharge water pressure within such a selected range under varying conditions. In one exemplary embodiment, proper operation of the pump panel training device depends upon a simulated water demand, which can vary throughout a simulation event based upon which and how many sprinkler zones within a building are currently requiring a water flow.

Compressed air foam can be utilized in fire-fighting. The disclosed pump panel training device can simulate use of a compressed air foam system. A control input simulating control over a compressed air foam system can include an air valve control for each discharge A dry hydrant is a device used in actual settings that includes pipes connected to a water source such as a pond. In contrast to fire hydrants in urban areas where the fire hydrant has access to pressurized water, dry hydrants are initially without water and enable a fire truck to draw water through the attached pipe from the water source to the dry hydrant. A simulation event can be programmed to test procedures to access water through a dry hydrant.

A simulation event builder program can be made available to an instructor, providing the instructor with an ability to program and save customized simulation events.

In one embodiment, the disclosed simulator can be operated in cooperation with an emergency vehicle driving simulator, such that performance and decisions made in the driving simulator affect parameters in the simulation incorporating the pump panel training device. For example, controls in a driver's cockpit must be activated prior to operation of a pump panel starting. A simulation event can coordinate between the simulators to determine and require that proper activation of the simulated controls in the cockpit occur prior to operation of the simulated pump panel. In another example, distance from a fire hydrant, distance from a fire-fighting scene, location in relation to a second truck with a pump panel, elevation of the truck in relation to a water source, and location in relation to a loud piece of equipment can all be used to simulate conditions in a simulation event. A data link between computerized controls of the driving simulation and the disclosed simulation incorporating the pump panel training device can exchange data related to various parameters, including but not limited to simulated engine RPM, power-take-off engagement, engine oil pressure, water temperature, and other data related to running or pausing the simulation event.

Referring now to the drawings, wherein the showings are for the purpose of illustrating certain exemplary embodiments only and not for the purpose of limiting the same, FIG. 1 schematically illustrates in a front view an exemplary first embodiment of a pump panel training device including a side mount pump panel device. Pump panel training device 10 is illustrated including cabinet 20, display monitor 30, and audio speaker 40. Pump panel training device 10 includes a plurality of simulated controls, simulated outputs, and simulated connection fittings useful to train a trainee in operation of an actual pump panel device. Simulated connection fittings include intake connection 50, simulating an exemplary five inch diameter hose connection; preconnection fitting 80, simulating an exemplary 2.5 inch diameter hose connection; discharge connection 86, simulating an additional exemplary 2.5 inch diameter hose connection; and discharge connection 87, simulating an additional exemplary 2.5 inch diameter hose connection. Simulated outputs include master intake pressure gage 60, master discharge pressure gage 61, driver side preconnect pressure gage 62, driver side preconnect pressure gage 63, passenger side discharge (No. 2) pressure gage 64, deluge discharge pressure gage 65, driver side discharge (No. 1) pressure gage 70, and driver side discharge (No. 3) pressure gage 71. Simulated controls include driver side preconnect control knob 66, driver side preconnect control knob 67, passenger side discharge (No. 2) control knob 68, deluge discharge control knob 69, driver side discharge (No. 1) control knob 72, and driver side discharge (No. 3) control knob 73. Additionally, driver side discharge (No. 1) control knob 82, driver side discharge (No. 3) control knob 83, driver side preconnect control knob 84, and driver side preconnect control knob 85 are provided. Additionally, a pump intake shut-off lever 81 is provided. Additionally, an intake control valve knob 52 is provided. Additionally, an intake tap fitting 54 is provided. Additionally, pump priming controls 78, engine throttle controls 74, valve control knob 75, transfer valve control switch 79, tank file and recirculating line control knob 76, on-board tank to pump control knob 77, and manual pump priming control knob 90 are provided. Additionally, informational placard 88 and informational placard 89 are illustrated, providing important information for operation of the device.

Cabinet 20 includes a metallic box operable to house components of pump panel training device 10. Cabinet 20 can include wheels 22 operable to permit movement of pump panel training device 10.

Display 30 permits pump panel training device 10 to illustrate complex or optional displays depending upon a configuration of the simulation event being operated. For example, details regarding an optional compressed air foam system can be displayed upon display 30. Display 30 can include an exemplary liquid crystal display. Display 30 can include a touch-screen device capable of displaying information and receiving inputs through a trainee touching different parts of display 30. Display 30 can relay information to the trainee, for example, displaying a current level of an on-board water tank or a current level of an on-board foam tank. In one exemplary embodiment, at a conclusion of a simulation event, display 30 can display results of the simulation event to the trainee.

Intake connection 50 is illustrated without any hose or hose portion connected to it for clarity of illustration. According to embodiments of the disclosure, a hose or a hose portion can be connected to intake connection 50, the hose or hose portion can be filled with a substance such as air or water, and heat, pressure, and vibration of the hose or hose portion can be controlled through a simulation event. In one embodiment, a trainee receiving high marks in a simulation event can depend upon the trainee sensing conditions in the hose and changing control input settings based upon the sensed conditions.

Figure 2:
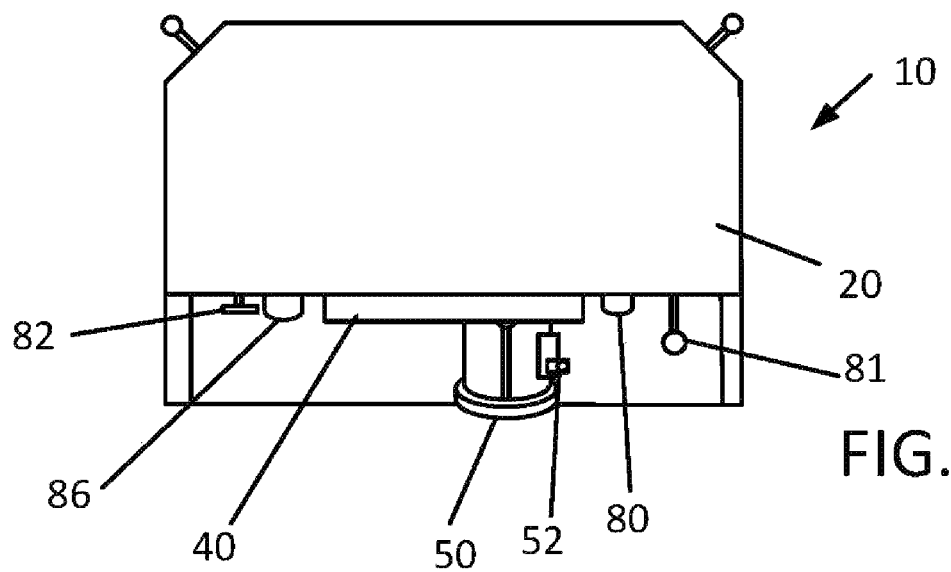
FIG. 2 schematically illustrates in a top view the pump panel training device of FIG. 1, in accordance with the present disclosure.

FIG. 2 schematically illustrates in a top view the pump panel training device of FIG. 1. Pump panel training device 10 is illustrated, including cabinet 20, intake connection 50, preconnection fitting 80, discharge connection 86, audio speaker 40, pump intake shut-off lever 81, intake control valve knob 52, and driver side discharge (No. 1) control knob 82.

Figure 3:
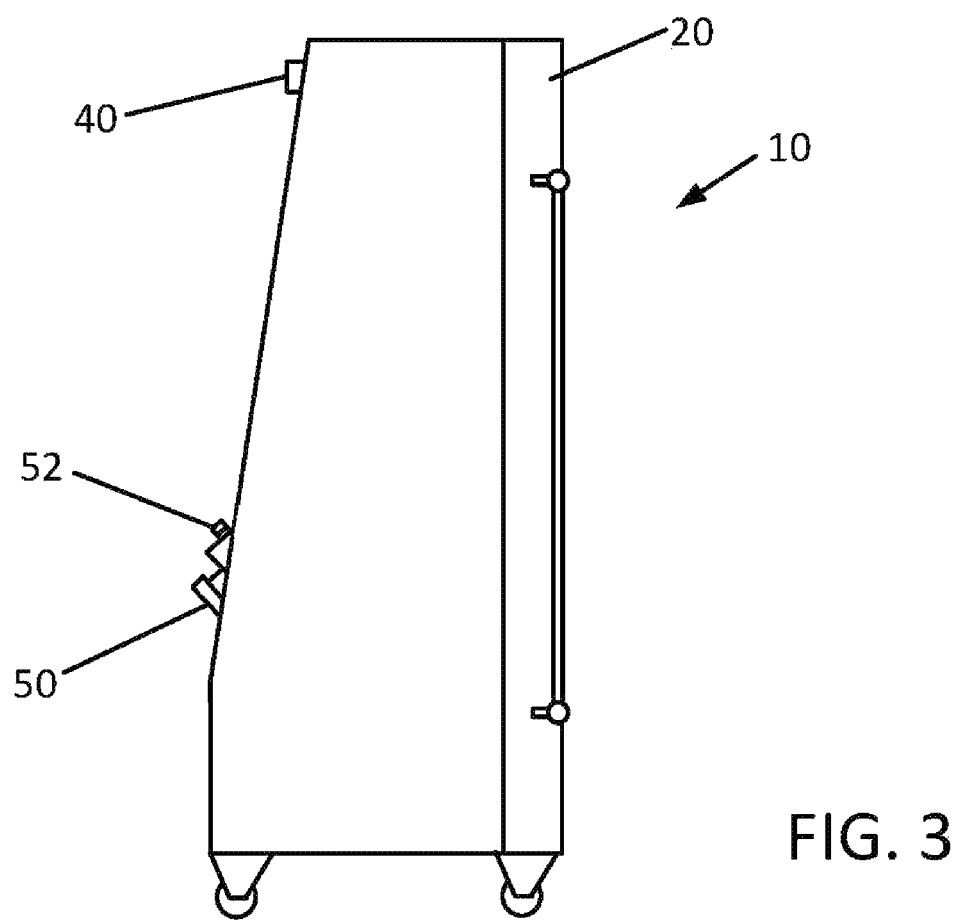
FIG. 3 schematically illustrates in a side view the pump panel training device of FIG. 1, in accordance with the present disclosure.

FIG. 3 schematically illustrates in a side view the pump panel training device of FIG. 1. Pump panel training device 10 is illustrated, including cabinet 20, audio speaker 40, intake connection 50, and intake control valve knob 52.

The embodiment illustrated in FIGS. 1-3 is provided as an illustrative example of how a pump panel training device can be configured. It will be appreciated that a manufacturer of such a pump panel training device can change control, display, and connection fittings to simulate different actual pump panels. Actual controls, gages, and connection fittings can be fitted to cabinet 20 to increase realism, with internal electronics within cabinet 20 transforming computerized control signals and data within cabinet 20 into and from interactions with the controls, gages, and connection fittings situated upon the exterior of cabinet 20. A wide variety of cabinet and component configurations are envisioned, and the disclosure is not intended to be limited to the particular examples provided herein.

Figure 4:
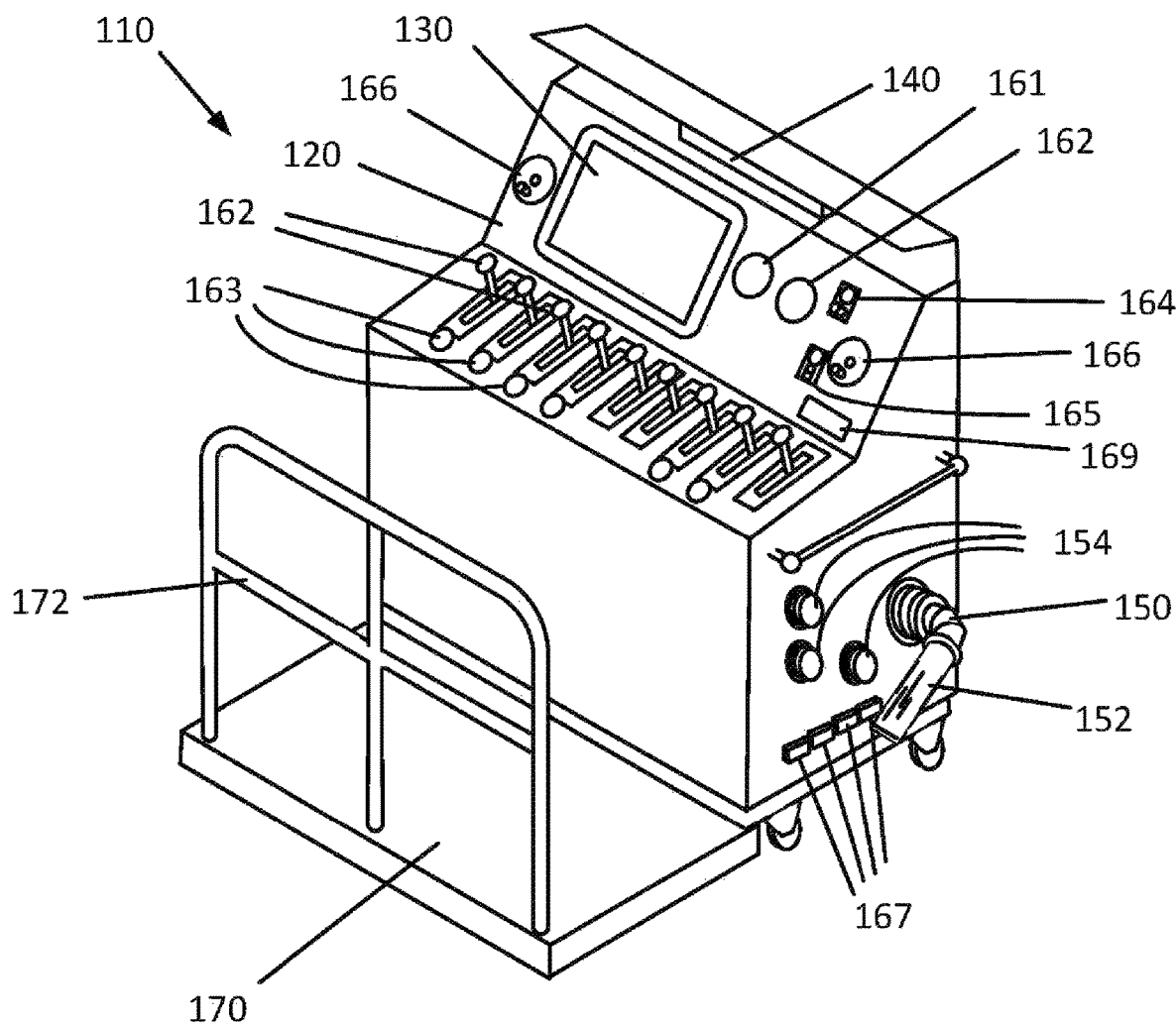
FIG. 4 schematically illustrates in a perspective view an exemplary second embodiment of a pump panel training device, in accordance with the present disclosure.

FIG. 4 schematically illustrates in a perspective view an exemplary second embodiment of a pump panel training device including a top mount pump panel device. Pump panel training device 110 is similar to pump panel training device 10 of FIG. 1, with the exception that pump panel training device 110 is operable to simulate an actual pump panel device that would be situated on a top of a fire truck instead of on a side of a fire truck. Pump panel training device 110 is illustrated including cabinet 120, display 130, audio speaker 140, trainee stand 170, and stand railing 172. Pump panel training device 110 includes a plurality of control levers 162 and control knobs 167 operable to simulate levers and knobs that exist on a similar actual pump panel device. Further, pump panel training device 110 includes intake pressure gage 161, discharge pressure gage 161, and a plurality of pressure gages 163 operable to simulate pressure gages that exist on a similar actual pump panel device. Pump panel training device 110 further includes a pair of valve control knobs 166, pump priming control 165, engine throttle control 164, and informational placard 169. Pump panel training device 110 further includes intake connection 150 and connections 154. Intake connection 150 includes an attached hose portion 152 including a hose portion with a round connection fitting on one end operable to attach to intake connection 150 and a sealed end on a second end. Cabinet 120 includes internal components that can fill hose portion 152 with a substance such as water or air and can heat, pressurize, and/or vibrate the substance to simulate conditions that occur on a hose connected to an actual pump panel during operation.

Figure 5:
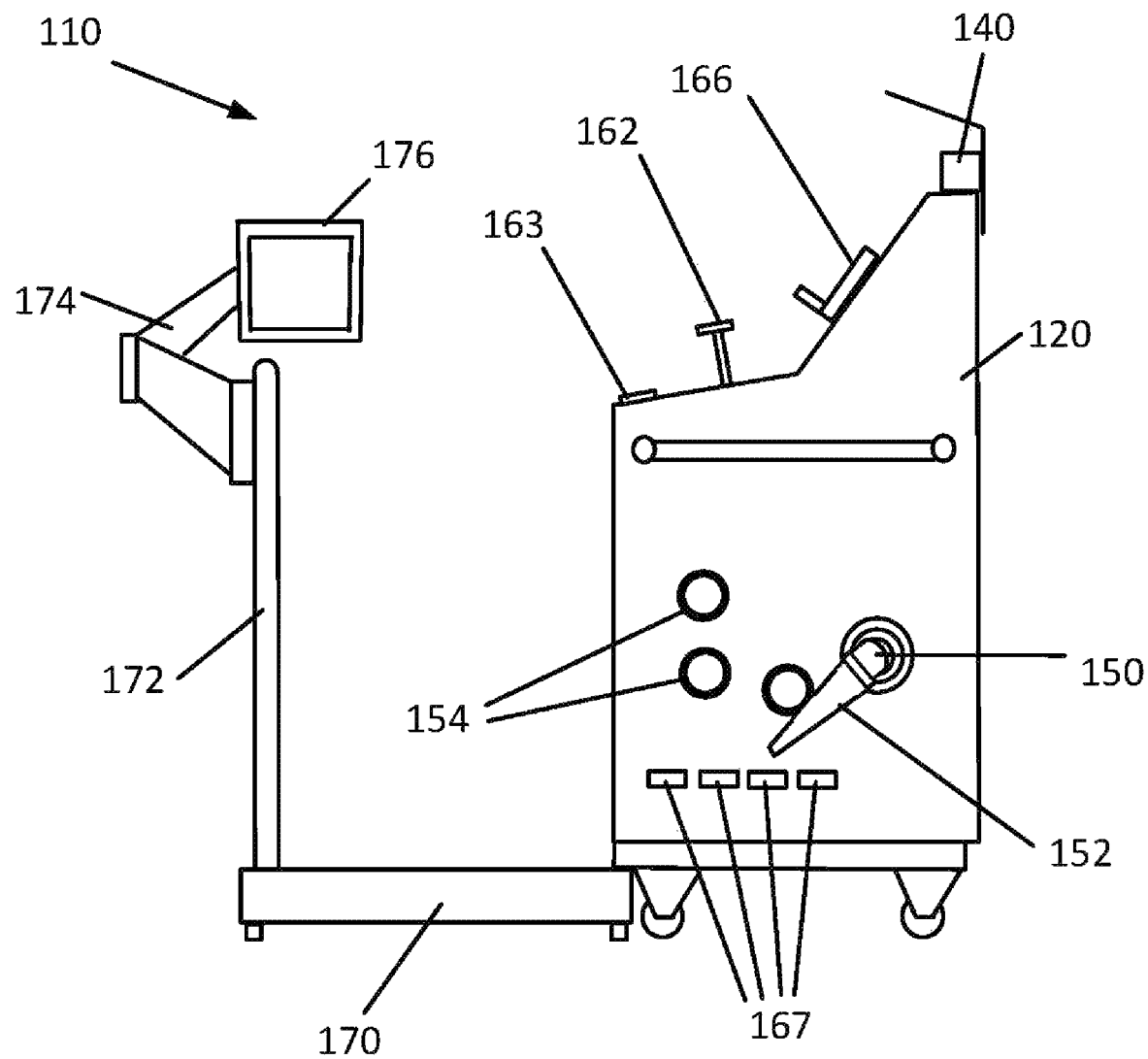
FIG. 5 schematically illustrates in a side view the pump panel training device of FIG. 4, in accordance with the present disclosure.

FIG. 5 schematically illustrates in a side view the pump panel training device of FIG. 4. Pump panel training device 110 is illustrated including cabinet 120, audio speaker 140, trainee stand 170, and stand railing 172. Pump panel training device 110 includes a plurality of control levers 162 and control knobs 167. Further, pump panel training device 110 includes plurality of pressure gages 163. Pump panel training device 110 further includes valve control knob 166. Pump panel training device 110 further includes intake connection 150 and connections 154. Intake connection 150 includes an attached hose portion 152.

Pump panel training device 110 further includes an optional external display 176. External display 176 can be attached to any embodiment of a pump panel training device and at various locations on the pump panel training devices. Multiple external displays can be utilized on a single pump panel training device. External display 176 can include graphical displays useful to convey important information to a trainee, for example, including information about a water source that is being simulated or a hose configuration that is being simulated. External display 176 can be attached to pump panel training device 110 with an articulable arm 174.

Figure 6:
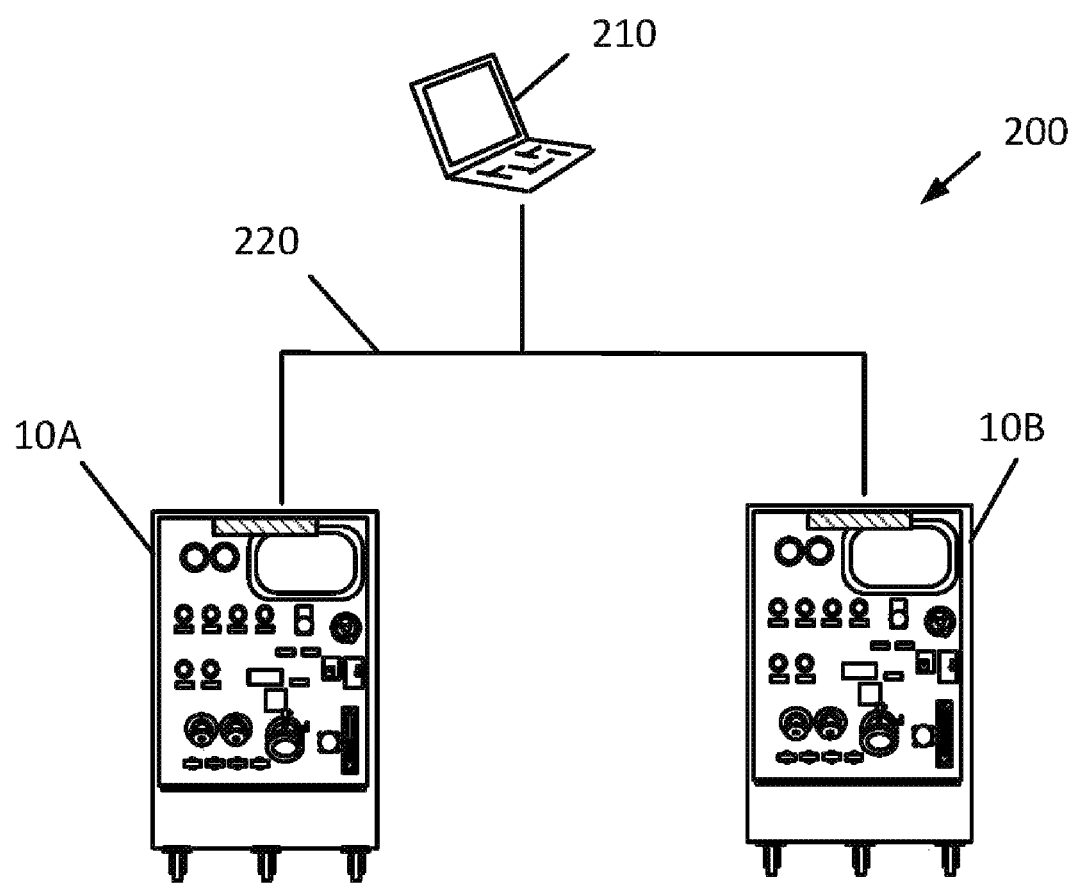
FIG. 6 illustrates an exemplary simulation system including a first pump panel training device, a second pump panel training device, and a supervisory computerized device, in accordance with the present disclosure.

FIG. 6 illustrates an exemplary simulation system including a first pump panel training device, a second pump panel training device, and a supervisory computerized device. Simulation system 200 is illustrated including a first pump panel training device 10A, a second pump panel training device 10B, and supervisory computerized device 210. In one embodiment, two pump panel training devices can be utilized in a same location, with two separate simulation events being operated in parallel, with a single supervisory computerized device controlling parameters of both simulation events. In another embodiment, first pump panel training device 10A and a second pump panel training device 10B can be used to operate a cooperative simulation event, for example, with first pump panel training device 10A simulating drawing water from a water source and supplying an intermediate flow of water to second pump panel training device 10B, which simulates receiving the intermediate flow of water from first pump panel training device 10A and delivering the water to a destination that needs the water.

Use of supervisory computerized device is optional. In some configurations, an instructor can enter parameters for an upcoming simulation event directly into a display of a pump panel training device without use of a separate supervisory computerized device. Supervisory computerized device 210 can include any computerized device including a desktop computer, a laptop computer, a tablet computer, a smart phone device, or other similar computerized device.

Figure 7:
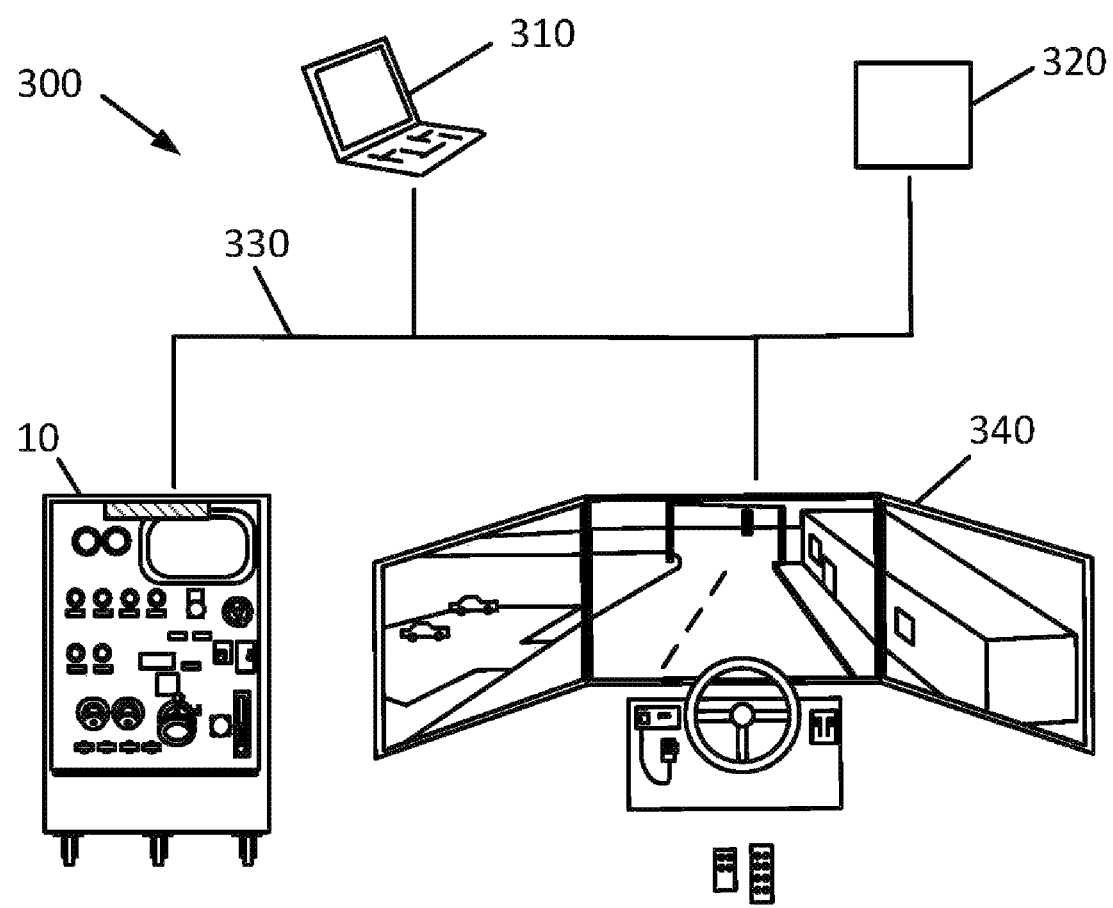
FIG. 7 illustrates an exemplary alternative simulation system including a pump panel training device, a driver training device, a supervisory computerized device, and a remote server device, in accordance with the present disclosure.

FIG. 7 illustrates an exemplary alternative simulation system including a pump panel training device, a driver training device, a supervisory computerized device, and a remote server device. Simulation system 300 is illustrated including a pump panel training device 10, a driver training device 340, supervisory computerized device 310, and remote server device 320. Pump panel training device 10 and driver training device 340 can be used to operate a cooperative training event, for example, with performance of the driver trainee affecting parameters for the pump panel trainee.

Use of a remote server device 320 is optional. A remote server device can be operated by a manufacturer of the system or by a large municipality operating a number of fire stations. Remote server device 320 can operate a pre-programmed set or sequence of simulation events. Remote server device 320 can provide a set of localized rules and protocols for particular regions or fire departments. Remote server device 320 can monitor and report simulation results. Remote server device 320 can provide assistance during simulation events, for example, with an expert standing by to provide guidance to trainees or technical experts standing by to answer questions about the system.

Figure 8:
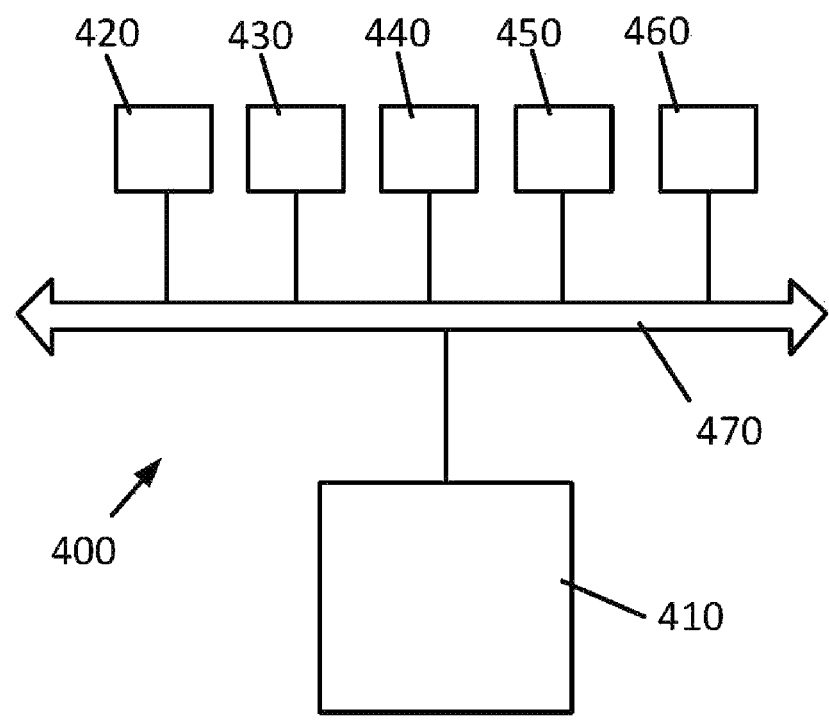
FIG. 8 schematically illustrates components of an exemplary pump panel training device communicating over a communications bus, in accordance with the present disclosure.

FIG. 8 schematically illustrates components of an exemplary pump panel training device communicating over a communications bus. Pump panel training device data communication system 400 is illustrated. Computerized pump panel control device 410 is located within a pump panel training device and is illustrated including a computerized processor operable to operate code and provide functionality related to simulation events. Communications bus 470 is a device useful to provide data communication between components of a system. Gage controller 420, control input controller 430, display controller 440, audio control 450, and hose portion controller 460 are illustrated connected to communications bus 470. Each of gage controller 420, control input controller 430, display controller 440, audio control 450, and hose portion controller 460 include electronic and/or electromechanical devices useful to provide functionality to the simulated gages, controls, and connection fittings of the pump panel training device.

Figure 9:
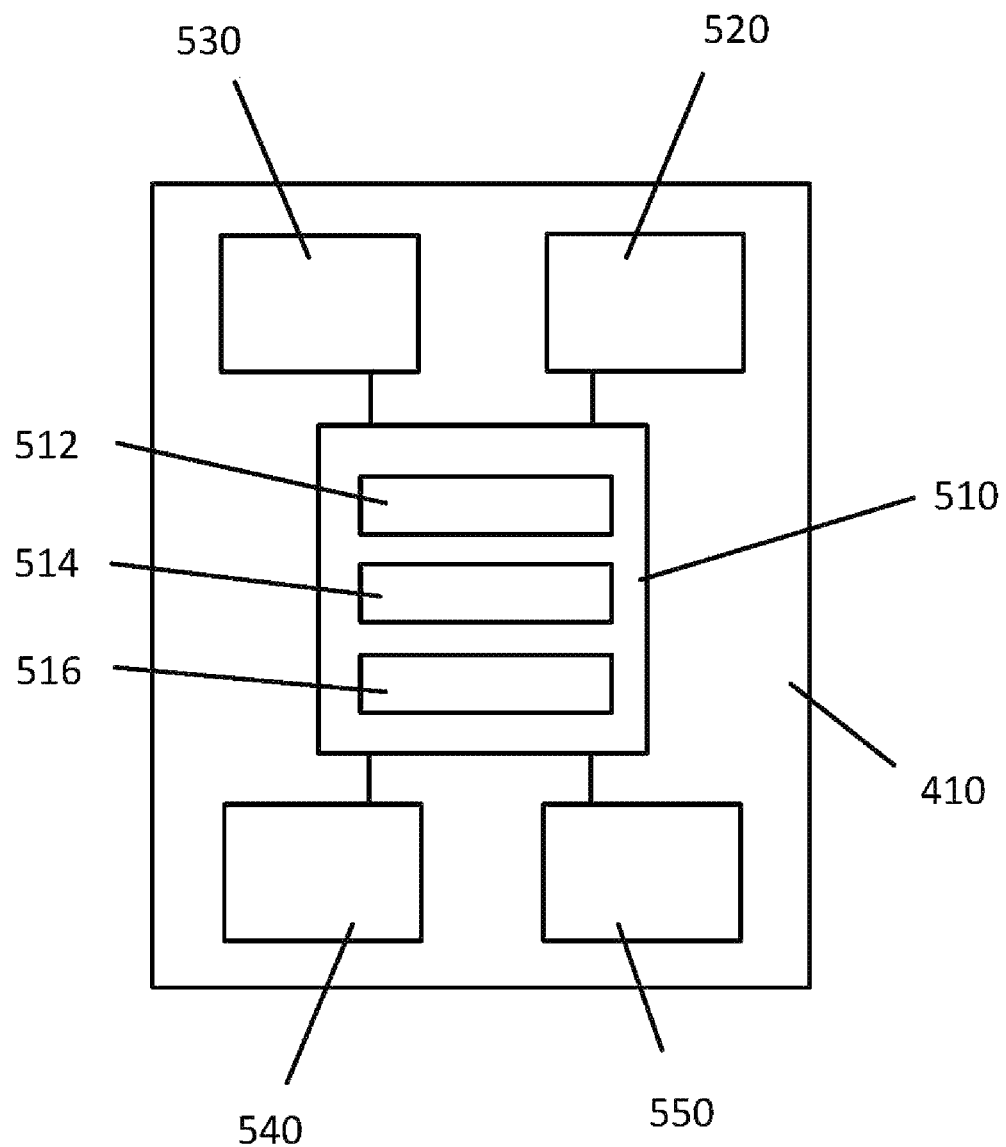
FIG. 9 schematically illustrates an exemplary computerized processor useful to operate a pump panel training device, in accordance with the present disclosure.

FIG. 9 schematically illustrates an exemplary computerized processor useful to operate a pump panel training device. Computerized pump panel control device 410 is illustrated, including processor device 510, durable memory storage device 550, communication device 520, input module 530, and output module 540.

Processor device 510 includes a computing device known in the art useful for operating programmed code. Processor device 510 includes RAM memory and can access stored data through connection to memory storage device 550. Memory storage device 550 may include a hard drive, flash drive, or other similar device capable of receiving, storing, and providing access to digital data. Memory storage device can include user data, map data, equipment information, rules and procedures data, scores and results data, and any other data necessary to operate the disclosed simulation events.

Processor device 510 includes programming modules including simulation event module 512, device hardware module 514, and scoring module 516 which represent programmed functions that are exemplary of processes that can be carried out within processor device 510 but are intended to be non-limiting examples of such processes. Simulation event module 512 includes programming and data operable to operate the described pump panel simulation events, monitor control inputs, determine event parameters such as resulting pressures in lines, and determine output data such as gage readings and hose portion control parameters. Device hardware module 514 includes programming to control and receive inputs from the various components of the pump panel training device, including but not limited to controlling gages and interpreting control input settings. Scoring module 516 compares simulated operation of the pump panel training simulator to programmed criteria. Modules 512, 514, and 516 can include any related programming and related processes and are intended only as non-limiting examples of how the system could be configured.

Input module 530 include any devices or mechanisms useful to receive trainee and instructor input to modulate operation of the simulation event, and can include but are not limited to simulated knobs, levers, buttons, and inputs to a touch screen display.

Output module 540 include any devices or mechanisms useful to provide outputs to display screens, gages, hose portions, audio speakers, and other devices necessary to provide output to the driver or instructor.

Communication device 520 includes any wired or wireless communication system required to send and receive data from the computerized device.

Figure 10:
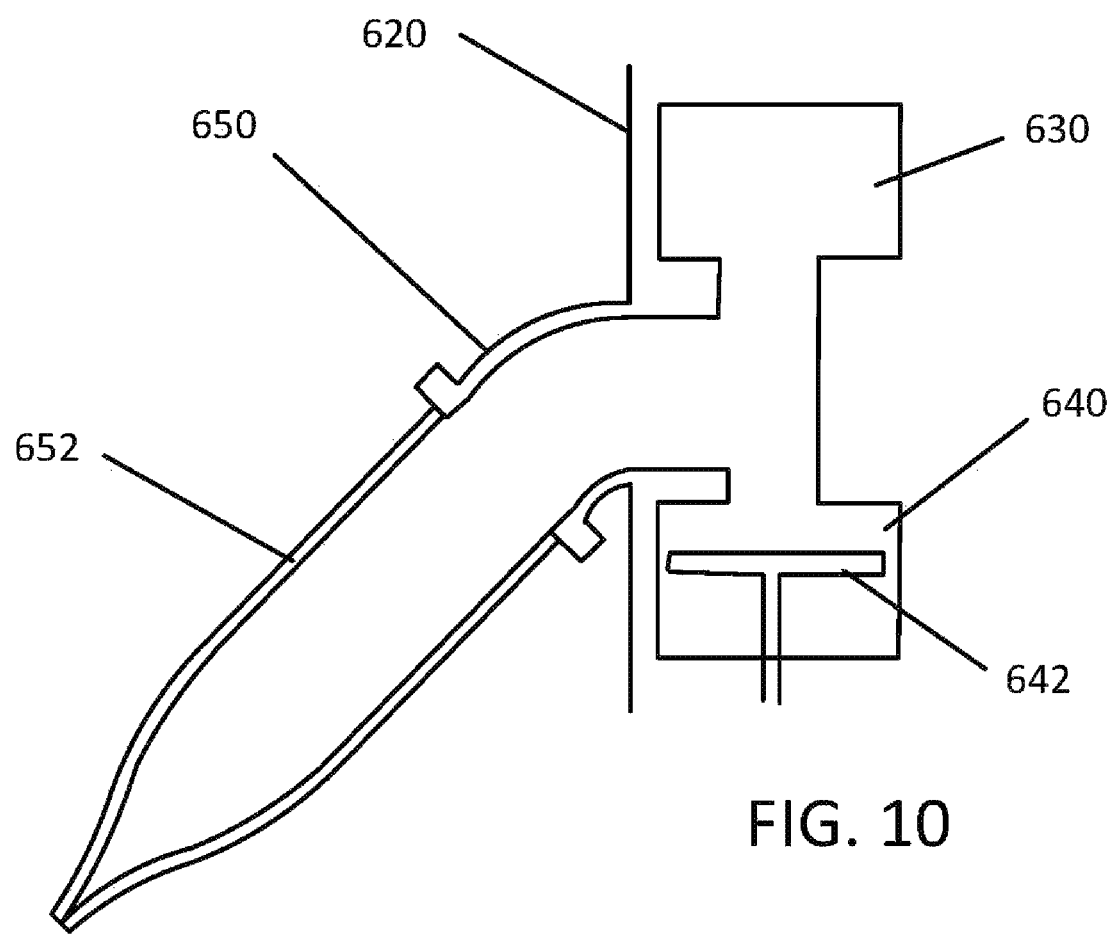
FIG. 10 schematically illustrates an exemplary hose portion connected to an exemplary intake connection of a pump panel training device, with components internal to the pump panel training device fluidly connected to the hose portion and operable to control temperature, pressure, and vibration of the hose portion, in accordance with the present disclosure.

FIG. 10 schematically illustrates in cross-sectional view an exemplary hose portion connected to an exemplary intake connection of a pump panel training device, with components internal to the pump panel training device fluidly connected to the hose portion and operable to control temperature, pressure, and vibration of the hose portion. Cabinet outer surface 620 as part of a pump panel training device is illustrated including a connected intake connection 650. Hose portion 652 is connected to intake connection 650. Exemplary components internal to the illustrated pump panel training device are illustrated including a substance thermal control device 630 and a substance pressure control device 640. Any number of various devices in the art can be used as thermal control device 630, which can include heating coils, a coolant loop, and/or a refrigerant loop to selectively heat and cool water, air, or any other substance used to fill hose portion 652. Any number of various devices in the art can be used as thermal control device 630, which can include a mechanically driven piston 642 or any other mechanism useful for controlling pressure and/or vibration of the substance used to fill hose portion 652. In one example, a compressor providing pressurized air along with a plurality of control valves can be used to selectively change pressure acting upon the substance used to fill hose portion 652.

Figure 11:
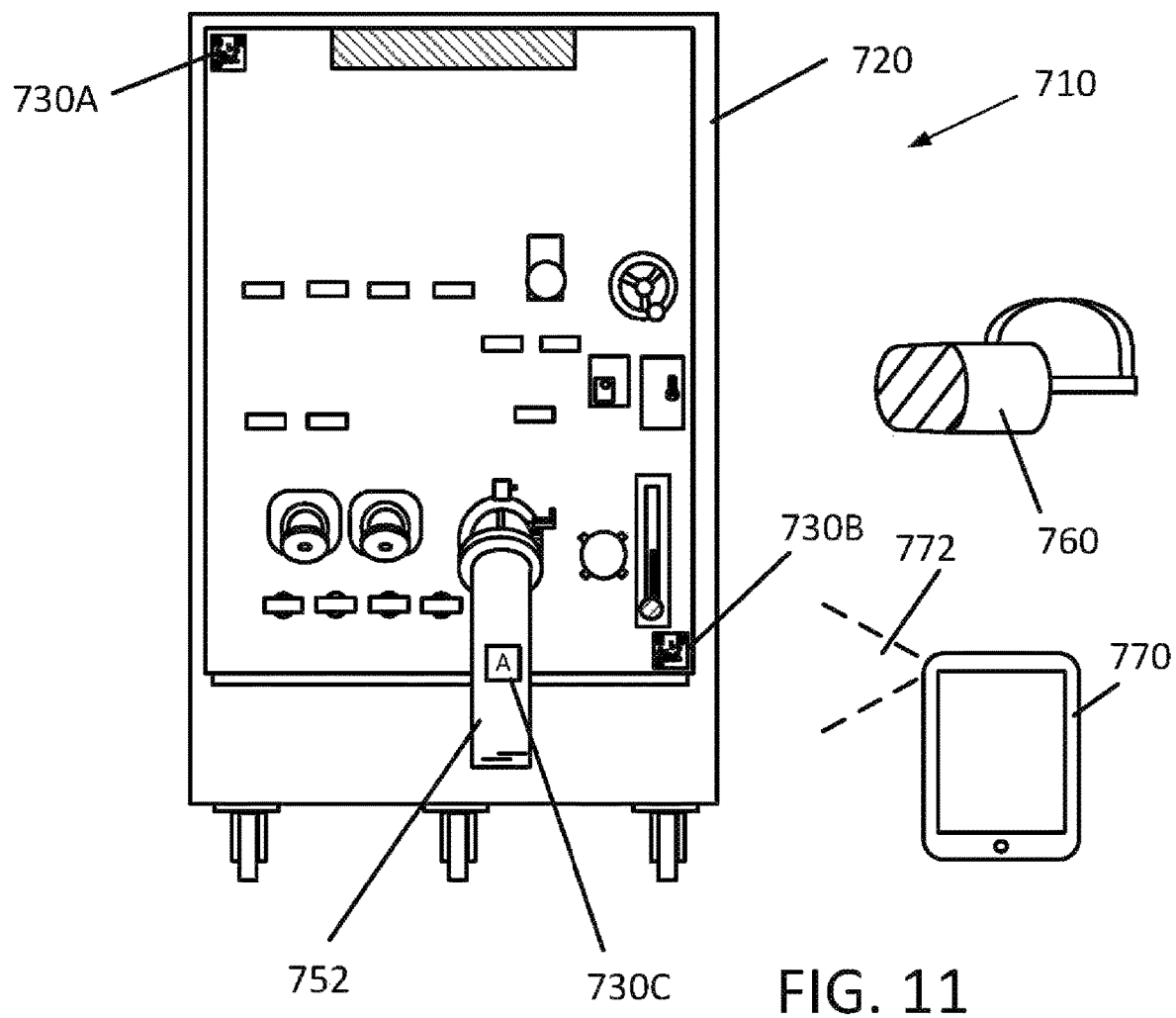
FIG. 11 schematically illustrates an exemplary pump panel training device operable to be operated with exemplary virtual reality and augmented reality devices, in accordance with the present disclosure.

FIG. 11 schematically illustrates an exemplary pump panel training device operable to be operated with exemplary virtual reality and augmented reality devices. Virtual reality or augmented reality can be utilized in combination with the disclosed pump panel training devices. Pump panel training device 710 is illustrated including cabinet 720 and audio speaker 740. Displays and gages have been omitted from pump panel training device 710, and instead a virtual reality headpiece 760 and a tablet computerized device 770 operable to operate augmented reality or mixed reality are illustrated. Tablet computerized device 770 is exemplary and can be substituted with any portable computerized device capable of operating augmented or mixed reality. Tablet computerized device 770 includes camera view angle 772 useful to capture images with device 770. Either virtual reality headpiece 760 or tablet computerized device 770 can be utilized in cooperation with pump panel training device 710 to operate a simulation event, for example, with gages and the display being provided as rendered graphics upon either virtual reality headpiece 760 or tablet computerized device 770. Visual tokens 730A and 730B are provided as exemplary QR codes and enable a computerized controller to coordinate movement of virtual reality headpiece 760 or tablet computerized device 770 with the rendered graphics, such that a user can still interact with pump panel training device 710 and the various control inputs thereupon while viewing simulation details upon virtual reality headpiece 760 or tablet computerized device 770. Similarly, a visual token 730C embodied as a logo upon hose portion 752 is provided to enable the computerized controller to coordinate movement of virtual reality headpiece 760 or tablet computerized device 770 with the rendered graphics, such that a user can still interact with hose portion 752 and receive temperature, pressure, and vibratory sensations therefrom.

Figure 12:
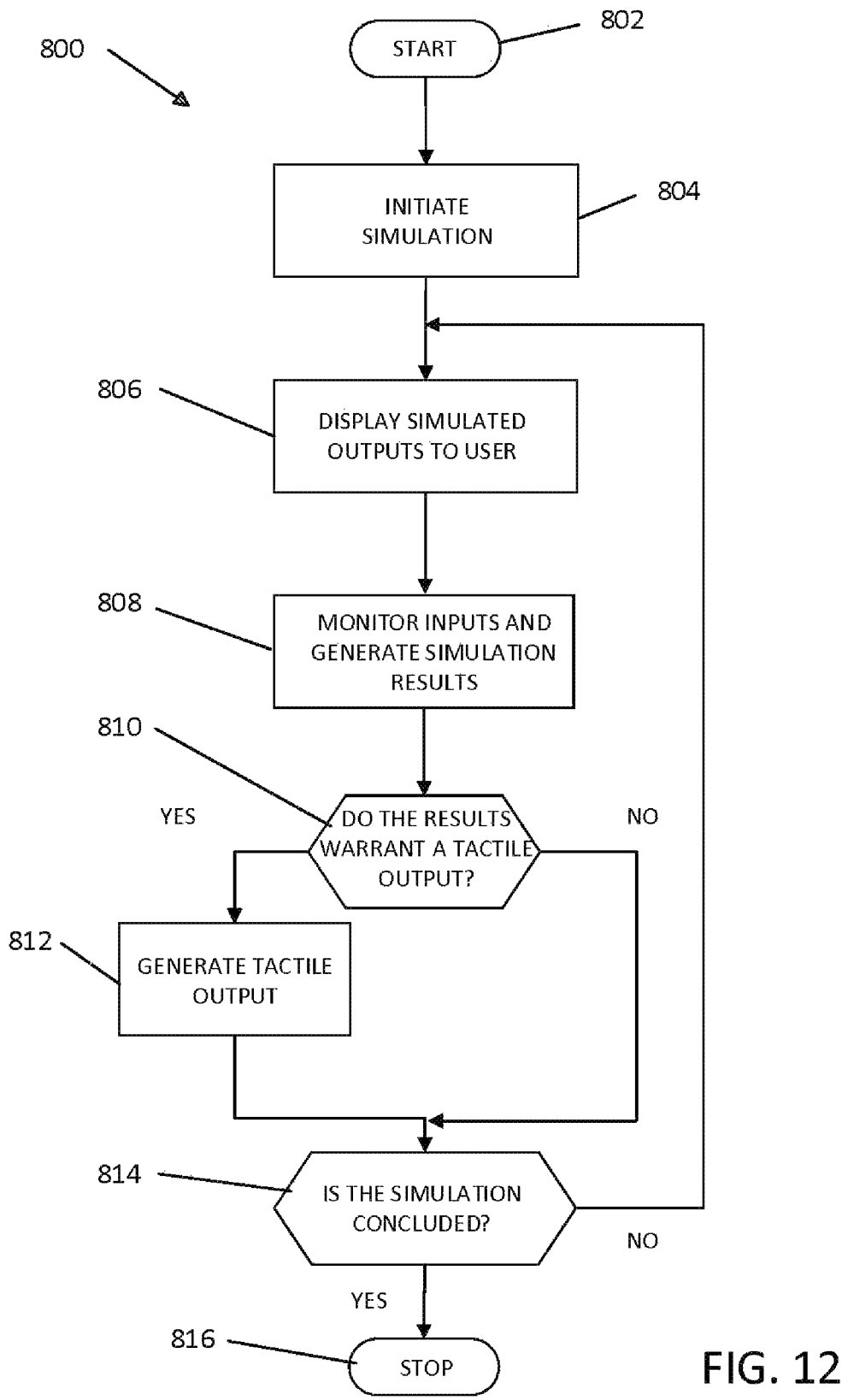
FIG. 12 is a flowchart illustrating an exemplary process to provide tactile outputs to a user related to a pump panel simulation, in accordance with the present disclosure.

FIG. 12 is a flowchart illustrating an exemplary process to provide tactile outputs to a user related to a pump panel simulation. Process 800 starts at step 802. At step 804, the system initiates the simulation, including utilizing any parameters that are pre-programmed for the simulation and/or selected by a trainer supervising the simulation. At step 806, simulated outputs generated by the simulation are displayed to the user, for example, with pressure gage readings, audio outputs, and warning lights providing a user with a simulated status of a pump panel. At step 808, inputs from the user regarding the simulation and simulated control of the pump panel are monitored and simulation results based upon the inputs are generated, for example, simulating an effect of activating a particular valve upon water pressures throughout the system. At step 810, a determination is made whether the simulated results warrant a tactile output, for example, changing a pressure within a hose portion attached to the pump panel. If no tactile output is warranted, the process advances to step 814. If a tactile output is warranted, the process advances to step 812 where components or devices available to and controlled by the simulation create the warranted tactile outputs. At step 814, a determination is made whether the simulation is concluded. If the simulation is not concluded, the process returns to step 806 to reiterate steps of the simulation. If the simulation is concluded, then the process ends at step 816. Process 800 is provided as an exemplary process that can be utilized to operate a pump panel simulator in accordance with the present disclosure. Other embodiments of the process are envisioned in accordance with the disclosure, and the disclosure is not intended to be limited to the examples provided herein.

Figure 13:
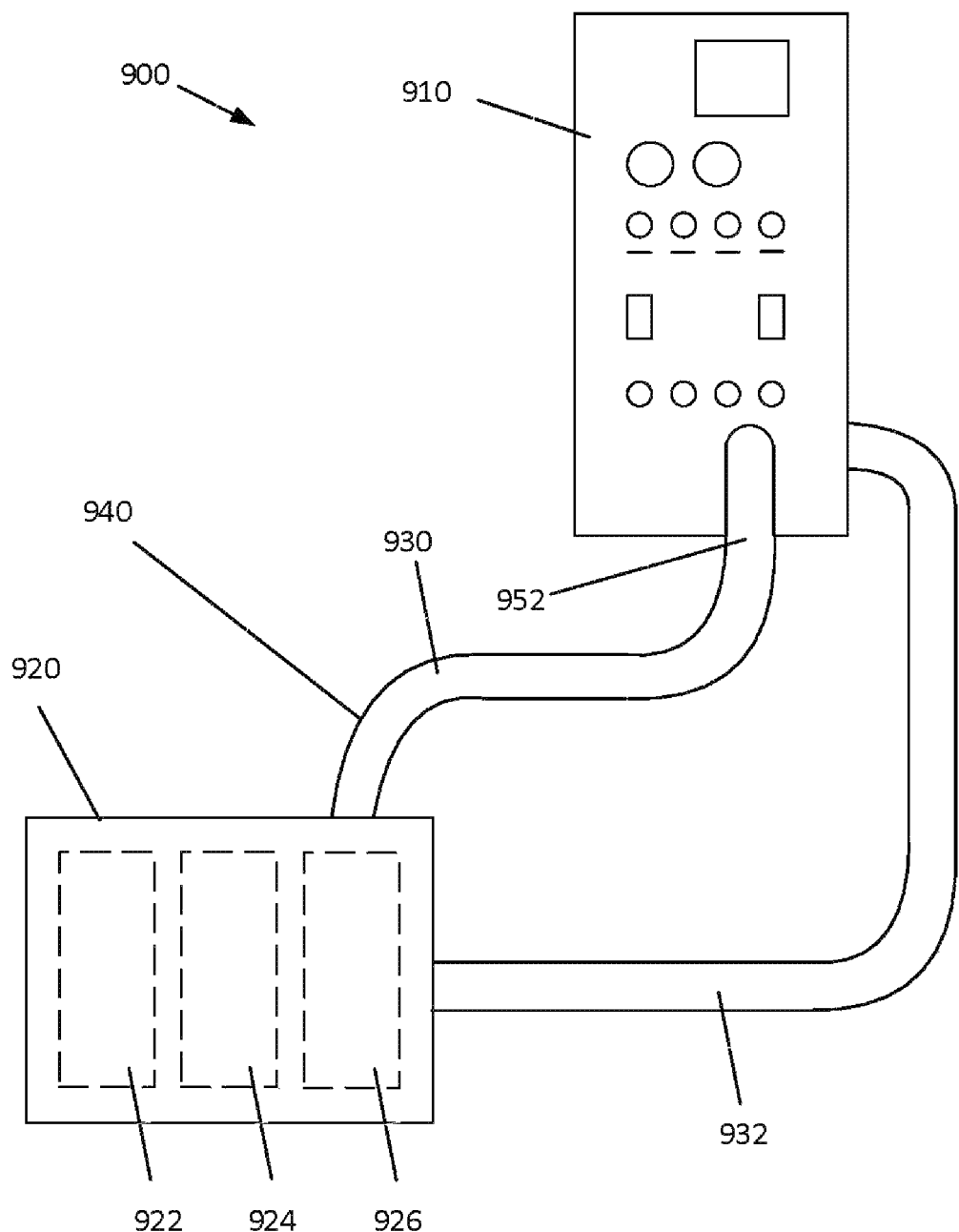
FIG. 13 schematically illustrates an exemplary alternative configuration of a pump panel training device used in tandem with a water hose circuit.

FIG. 13 schematically illustrates an exemplary alternative configuration of a pump panel training device used in tandem with a water hose circuit. System 900 is illustrated including pump panel training device 910 including simulated water hose 952 operable to provide a tactile output to a user of pump panel training device 910. In order to provide a realistic tactile output, simulated water hose 952 is part of water hose circuit 940 operable to circulate water through simulated water hose 952. Water hose circuit 940 includes supply hose 930, return hose 932, and water pump and conditioning unit 920. Water pump and conditioning unit 920 is illustrated as a separate physical device from pump panel training device 910. In some embodiments, water pump and conditioning unit 920 may be integral with pump panel training device 910, with water flowing through an external loop of water hose including supply hose 930.

Water pump and conditioning unit 920 may include water pump 922 operable to create water pressure within supply hose 930 and circulate water through water hose circuit 940. Water pump and conditioning unit 920 may include water temperature control device 924 operable to heat and/or cool water flowing through water hose circuit 940 and may include elements such as electric heating coils and a refrigerant cooling circuit to effect changes to water temperature. In one embodiment, water temperature control device 924 can include one or more water reservoirs useful to maintain a quantity of water at a certain temperature to increase an ability of the simulation to quickly deliver a change to water temperature. Water pump and conditioning unit 920 may include water vibration control device 926 operable to create pulses or rapid pressure variations in the water flow through water hose circuit 940. Water hose circuit 940 is provided as an exemplary embodiment, and the disclosure is not intended to be limited to the examples provided herein.

The disclosure has described certain preferred embodiments and modifications of those embodiments. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. An apparatus comprising a pump panel training device, comprising:
   a plurality of simulated gages operable to imitate gages upon a fire truck pump panel; and
   a plurality of simulated controls operable to imitate controls upon the fire truck pump panel; and
   one of a hose portion attached to the apparatus or an intake connection configured for attachment of the hose portion to the apparatus.

2. The apparatus of claim 1, further comprising a display operable to display rendered graphics.

3. The apparatus of claim 2, wherein the display comprises an external display operable to display details of a simulated environment around the pump panel training device.

4. The apparatus of claim 1, further comprising a virtual reality visor.

5. The apparatus of claim 1, further comprising a computerized device operable to operate augmented reality.

6. A system comprising a plurality of pump panel training devices, comprising:
   the plurality of pump panel training devices, each comprising:
      a plurality of simulated gages operable to imitate gages upon a fire truck pump panel; and
      a plurality of simulated controls operable to imitate controls upon the fire truck pump panel; and
   a computerized device operable to coordinate data between the plurality of pump panel training devices.

7. The system of claim 6, wherein the computerized device is further operable to simulate a first of the pump panel training devices supplying a flow of water to a second of the pump panel training devices.

8. A system comprising a pump panel training device and a driver training device, comprising:
   the pump panel training device, comprising:
      a plurality of simulated gages operable to imitate gages upon a fire truck pump panel; and
      a plurality of simulated controls operable to imitate controls upon the fire truck pump panel;
   the driver training device operable to simulate driving operation of a fire truck, and
   a computerized device operable to coordinate data between the pump panel training device and the driver training device.

9. The apparatus of claim 1, wherein the intake connection includes an intake control valve knob.

10. The apparatus of claim 9, wherein the intake connection further includes an intake tap fitting.

11. The apparatus of claim 1, wherein the intake connection includes an intake tap fitting.

12. The apparatus of claim 1, further comprising the hose portion attached to the intake connection.

13. The apparatus of claim 12, wherein the hose portion is filled.

14. The apparatus of claim 1, wherein the intake connection includes a round fitting.

15. The system of claim 8, wherein the pump panel training device further includes an intake connection configured for attachment to a hose portion; and
   wherein the intake connection includes an intake control valve knob.

16. The system of claim 15, wherein the intake connection further includes an intake tap fitting.

17. The system of claim 8, wherein the pump panel training device further includes an intake connection configured for attachment to a hose portion; and
   wherein the intake connection includes an intake tap fitting.

18. The system of claim 8, wherein the pump panel training device further includes an intake connection configured for attachment to a hose portion; and
   further comprising the hose portion attached to the intake connection.

19. The system of claim 18, wherein the hose portion is filled.

20. The system of claim 8, wherein the pump panel training device further includes an intake connection configured for attachment to a hose portion; and
   wherein the intake connection includes a round fitting.

* * * * *